United States Patent [19]

Kubo

[11] Patent Number: 4,811,129
[45] Date of Patent: Mar. 7, 1989

[54] METHOD AND AN APPARATUS FOR DETECTING TAPE SPEED OF RECORDING

[75] Inventor: Kanji Kubo, Hirakata, Japan

[73] Assignee: Matsushita Electric Industrial Co., Ltd., Kadoma, Japan

[21] Appl. No.: 936,505

[22] Filed: Dec. 1, 1986

[30] Foreign Application Priority Data

Nov. 29, 1985 [JP] Japan .................. 60-269759

[51] Int. Cl.⁴ .................. G11B 5/52; G11B 15/467
[52] U.S. Cl. .................. 360/73.12; 360/9.1; 360/10.2; 360/77.15
[58] Field of Search .................. 360/70, 73, 77, 61, 360/10.1–10.3, 18, 27, 9.1, 8; 358/321, 323

[56] References Cited

U.S. PATENT DOCUMENTS

| | | | |
|---|---|---|---|
| 4,297,733 | 10/1981 | Sanderson | 360/77 |
| 4,607,298 | 8/1986 | Yamashita | 360/73 |
| 4,618,899 | 10/1986 | Doutsubo | 360/73 |
| 4,663,673 | 5/1987 | Doutsubo | 360/73 |
| 4,680,648 | 7/1987 | Takayama | 360/73 |
| 4,683,503 | 7/1987 | Takimoto | 360/73 |
| 4,691,256 | 9/1987 | Kozuki et al. | 360/73 |

FOREIGN PATENT DOCUMENTS 59-19260  1/1984  Japan.
60-131661 7/1985  Japan.

*Primary Examiner*—Raymond F. Cardillo
*Assistant Examiner*—Steven R. Garland
*Attorney, Agent, or Firm*—Cushman, Darby & Cushman

[57] ABSTRACT

In a helical scanning type VTR utilizing a tracking error signal method using four kinds of pilot signals, a tape speed at recording is detected by comparing a threshold level value with the level difference between the outputs before and after the change in the two kinds reference signals which are supplied to a multiplying circuit within one magnetic head scanning period, the multiplying circuit obtaining sum and difference frequency signals between a reproduced pilot signal and the reference signal.

6 Claims, 14 Drawing Sheets

FIG.6(a) H.SW

FIG.6(b) Reference signal

FIG.6(c) REC, PB same mode

FIG.6(d) REC → SP
PB → LP

FIG.6(e) REC → LP
PB → SP

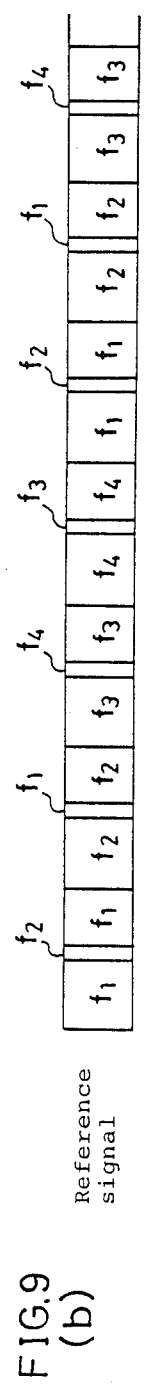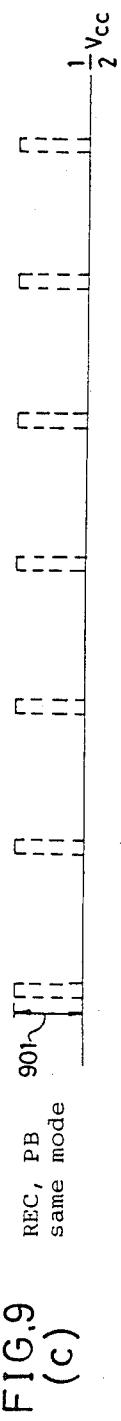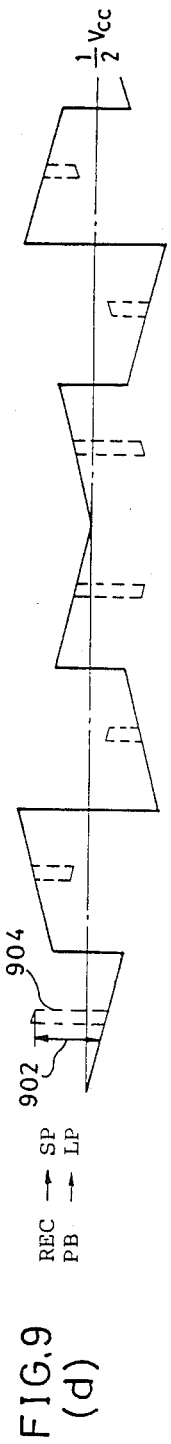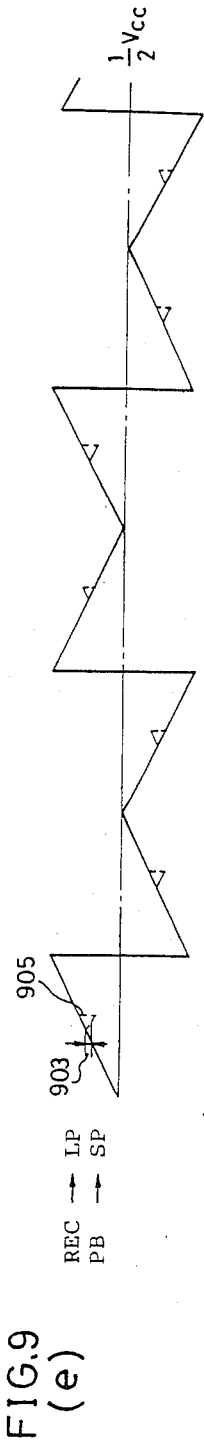
FIG.9(a) H.SW
FIG.9(b) Reference signal
FIG.9(c) REC, PB same mode
FIG.9(d) REC → SP, PB → LP
FIG.9(e) REC → LP, PB → SP

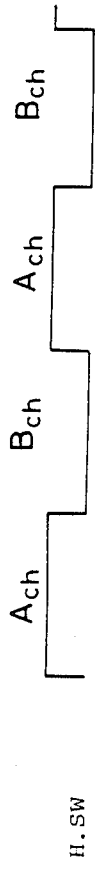
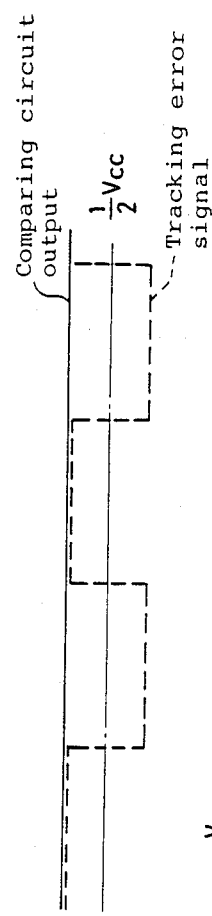
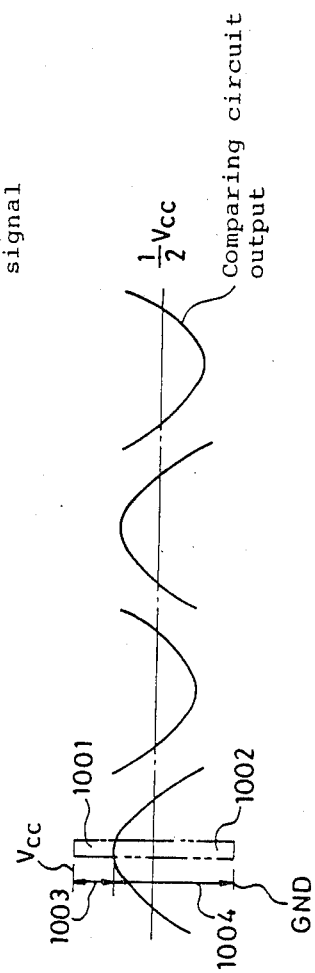
FIG.10 (a)
FIG.10 (b)
FIG.10 (c)
FIG.10 (d)

FIG.11

| Reference signal | Binary |   |
|---|---|---|
| $f_1$ | 0 | 0 |
| $f_2$ | 0 | 1 |
| $f_3$ | 1 | 0 |
| $f_4$ | 1 | 1 |

FIG.12

| H.SW | Normal reference signal | High level | | Low level | |
|---|---|---|---|---|---|
| | | Reference signal | up/down number | Reference signal | up/down number |
| Ach | $f_1$ | $f_2$ | +1 | $f_4$ | +3 |
| Bch | $f_2$ | $f_1$ | -1 | $f_3$ | -3 |
| Ach | $f_3$ | $f_4$ | +1 | $f_2$ | +3 |
| Bch | $f_4$ | $f_3$ | -1 | $f_1$ | -3 |

METHOD AND AN APPARATUS FOR DETECTING TAPE SPEED OF RECORDING

FIELD OF THE INVENTION AND RELATED ART STATEMENT

Field of the Invention

The present invention is related to a method for detecting tape speed of recording in a magnetic recording and reproducing apparatus (hereinafter abbreviated a VTR), particularly to a method for detecting tape speed of recording in a VTR using pilot signals of 4 frequencies.

Description of the Related Art

Prior to description of a conventional method, an outline of a tracking control system using 4 kinds of pilot signals of different frequencies which are concerned with the present invention is described (U.S. Pat. No. 4,297,733).

In FIG. 14, magnetized tracks of 4 kinds of pilot signals of different frequencies are disclosed. In the figure, marks $A_1$, $B_1$, $A_2$, $B_2$, ... show the magnetized tracks recorded by a magnetic head B, and marks $f_1$ to $f_4$ show pilot signals for tracking control. Each pilot signal is recorded mixing video signals in a manner that the pilot signals are recorded cyclically in the order of $f_1 \rightarrow f_2 \rightarrow f_3 \rightarrow f_4 \rightarrow f_1 \rightarrow \ldots$ every one field. The frequencies of the pilot signals are 6.5 $f_H$ to 10.5 $f_H$ when the frequency of the horizontal synchronizing signal of the video signal is represented by "$f_H$". The difference are the frequencies of the pilot signals of the recorded magnetized tracks of $f_H$ and $3f_H$ as shown in FIG. 14. Therefore, the deviation amount of the magnetic head scanning against the recorded magnetized track can be detected by detecting the signals of the $f_H$ and $3f_H$ and comparing reproduced levels of the signals by a below-mentioned method.

FIG. 15 is a block diagram of a circuit for obtaining a tracking error signal from the reproduced pilot signal. In the figure, a circuit 1502 is a balanced modulation circuit. The reproduced pilot signal is applied to a terminal 1501 and a reference signal is applied to a terminal 1503. The reference signal has the same frequency as the pilot signal which is recorded on the magnetized track to be scanned by the magnetic head. For example, as shown in FIG. 14, when the magnetic head scans for reproducing on the track $B_1$, the frequencies of reproduced pilot signals are $f_1$, $f_2$, $f_3$ and the frequency of the reference signal is $f_2$. An output signal of the circuit 1502 has components of difference of frequencies of the reproduced pilot signal and the reference signal. The output signal of the difference has frequencies of $f_H$ and $3f_H$. The output levels of these difference signals are equal to the reproduced levels of the respective pilot signals which are recorded on the tracks neighboring the tracks on which the magnetic head mainly scans for reproducing. Circuits 1504 and 1506 are tuning circuits which tune in to such signals having frequencies of $f_H$ and $3f_H$, respectively. The output signal of each tuning circuit is detected and rectified by circuits 1505, 1507, and the rectified levels are compared with each other by a comparing circuit 1508. The output of the comparing circuit 1508 is inverted with regard to the level of (($\frac{1}{2}$)) $V_{cc}$ (where $V_{cc}$ is the power source voltage) which is taken as center of inversion by an inverter 1509. The inverted output signal and the non-inverted output signal are applied to a switching circuit 1510 and are issued alternately, every one field responding to a head switching signal (H.SW signal) supplied from a terminal 1511. As apparent from FIG. 14, the deviation direction of the magnetic head against the recorded track and the variation of the reproduced levels of the signals of $f_H$ and $3f_H$ have inverse relation to each other with regard to track $A_i(i=1, 2, 3, \ldots)$ and track $B_i$. Therefore, the polarity of the tracking error signal obtained on the terminal 1512 corresponds to the deviation direction respective of the scanned track when the polarity of the variation of the reproduced level is changed every one field by using the inverting circuit 1509.

Next, a conventional method for detecting a tape speed at recording, is described as follows.

Some VTRs have more than two kinds of tape speeds as the tape speed at recording. Here, the VTR having two kinds of tape speeds is described. A mode defined herein as SP (short) mode has a first tape speed and a mode defined herein as LP (long) mode has a second tape speed mode. The tape speed at the LP mode is ($\frac{1}{2}$) of the tape speed at the SP mode. When recording is made, selection of the SP and LP mode is manually operated by an operator. At reproducing, the mode at recording is automatically detected and the suitable mode is selected.

The SP/LP automatic selecting method of the VTR using the 4 frequency pilot signal, is shown in, for example, the Published Unexamined Patent Sho No. 59-19260. The method is executed by measuring the periodical variation of the tracking error signal when the tape speed at reproducing is different from that at recording. That is, the tracking error signal does not vary when the tape speeds are equal at recording and at reproducing. But when they are each other different, the tracking error signal periodically varies by 7.5 Hz under SP mode recording and LP mode reproducing, and periodically varies by 15 Hz under the LP mode recording and the SP mode reproducing. The method utilizes the above-mentioned variation of the tracking error signal.

But there is disadvantage in the method a when the tape speeds at recording and at reproducing are equal to each other, namely, the operation is in normal status, and the tracking error signal varies on account of load variation and so on, and the SP/LP automatic switching operation is liable to mis-operate.

Further, the method has a disadvantage in that the circuits become complicated when the method is applied to a high speed reproducing operation, because, for example, under a mode when the tape is set in normal direction or in reverse direction for reproducing a video image in a speed as high as nine times of the tape speed at recording (namely, cue mode and review mode), the obtained variation frequency of the tracking error signal has different values as shown in Table 1. Therefore, it is necessary to provide a circuit for discriminating each frequency, and therefore the circuits become complicated.

TABLE 1

| | Error signal variation frequency (Hz) | |
|---|---|---|
| | Cue mode | Review mode |
| Recording LP Reproducing SP | 255 | 285 |
| Recording, reproducing same mode | 120 | 150 |

TABLE 1-continued

| | Error signal variation frequency (Hz) | |
|---|---|---|
| | Cue mode | Review mode |
| Recording SP Reproducing LP | 52.5 | 82.5 |

Note) Value at ±9 times speed.

Further, such conventional method is known as in the Published Unexamined Patent application Sho No. 60-131661. The method detects the tape speed at recording by the periodical variation of level of one kind of the pilot signal selected from the four kinds of pilot signals. The periodical variation is of 15 Hz when the tape speeds are equal at recording and at reproducing, and of 7.5 Hz under the SP mode recording and the LP mode reproducing, and of 30 Hz under the LP mode recording and at SP mode reproducing.

But the method has a disadvantage in that further tuning circuits are necessary to select a pilot signal of one frequency. That is, a tuning circuit for selecting a signal near 100 KHz is executed, at present, by such tuning circuit using an L, C components generally, and therefore it is difficult to minimize the actual area of the circuits.

OBJECT AND SUMMARY OF THE INVENTION

The present invention intends to offer a method for detecting a tape speed at recording wherein disadvantages of the conventional methods are overcome.

A method for detecting a tape speed of recording in accordance with the present invention in magnetic recording and reproducing apparatus is that:

information is sequentially recorded as magnetized tracks which are oblique against a longitudinal direction, on a face of a magnetic tape, by a rotary magnetic head means having at least one rotary magnetic head, four kinds of pilot signals of different frequencies for tracking control are sequentially and cyclically mixed on the recorded information, a process circuit for a tracking error signal, including a multiplying circuit for obtaining plural kinds of difference frequency signals of reproduced pilot signals and reference signals, is provided, and the information on the magnetic tape is reproduced at the same tape speed as or a different tape speed from that of recording;

wherein the method comprises the steps of supplying two kinds of the reference signal to the multiplying circuit within one magnetic head scanning period of the rotary magnetic head means, and detecting the tape speed at recording by searching whether a level difference of outputs of a comparing circuit, obtained before and after change of the two kinds of the reference signals, is larger than a predetermined threshold value or not.

Further, a magnetic recording and reproducing apparatus in accordance with the present invention is that:

information is sequentially recorded as magnetized tracks which are oblique against a lengthwise direction, on a face of a magnetic tape, by a rotary magnetic head means having at least one rotary magnetic head, four kinds of pilot signals of different frequency for tracking control are sequentially and cyclically mixed on the information, a process circuit of a tracking error signal, including a multiplying circuit for obtaining plural kinds of difference frequency signals of reproduced pilot signals and reference signals, is provided, and the information on the magnetic tape is reproduced at the same tape speed as or a different tape speed from that of recording tape speed;

wherein the apparatus comprises:

supply means for supplying two kinds of reference signals to the multiplying circuit within one magnetic head scanning period of the rotary magnetic head means, level detecting means for detecting a level of a difference of outputs of a comparing circuit obtained before and after the change of the two kinds of the reference signals, deciding means for detecting whether the level of the difference of outputs is larger than a predetermined threshold value or not, count means for counting number when the level of the difference is equal to or larger than the threshold value within a predetermined period or number when the level of the difference is smaller than the threshold value, judge means for detecting whether the number is a predetermined value or not.

BRIEF DESCRIPTION OF THE DRAWINGS

FIGS. 9(a)–9(e) are diagrams of an output of the comparing circuit at normal reproducing under each mode.

FIGS. 10(a)–10(d) are diagrams of an output of the comparing circuit under various conditions.

FIG. 11 is a diagram of relation between a reference signal and binary value for selecting the reference signal.

FIG. 12 is a diagram showing a kind of the reference signal to be selected in order to make an output of the comparing circuit High level or Low level.

DESCRIPTION OF THE PREFERRED EMBODIMENTS

First, a relation between a magnetic head scanning position and an output of a comparing circuit is described.

Figure 13:
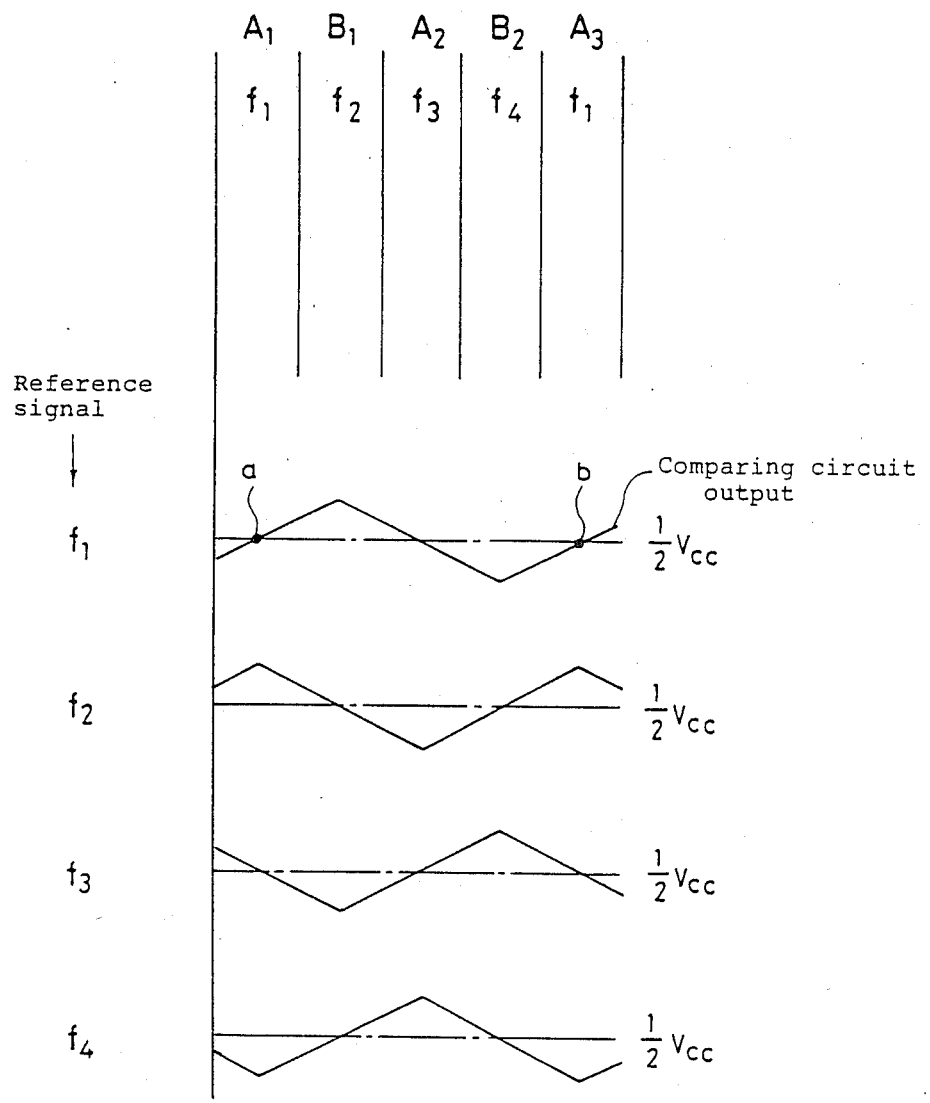
FIG. 13 is a diagram of relation between a magnetic head scanning position and an output of the comparing circuit.

FIG. 13 is a diagram showing a relation between a pilot signal on a magnetized track, a reference signal and an output of the comparing circuit. In the figure, under the condition that the reference signal is $f_1$, the output of the comparing circuit is a level of $(\frac{1}{2}) V_{cc}$ (on-track potential) when the magnetic head scans a track $A_1$; and the output is High level when the magnetic head scans on a track $B_1$; and the output is $(\frac{1}{2}) V_{cc}$ level when the magnetic head scans on a track $A_2$; and the output is Low level when the magnetic head scans on a track $b_2$. Such level variation is derived from a comparison of component levels between a difference frequency component $f_H$ and a difference frequency component $3f_H$, which are obtained as difference frequencies between the reference signal and the pilot signals which are reproduced from each track neighboring the track on which the magnetic head scans. Likewise, the level variation of the output of the comparing circuit when the reference signal is $f_2$, $f_3$ or $f_4$, can be derived.

The kind of reference signal when the tape speed at recording and the tape speed at reproducing are equal, namely, normal reproducing status, is the same kind as the pilot signal recorded on the magnetized track on which the magnetic head scans. Under such condition, the control system becomes stable. Therefore, the output of the comparing circuit when the magnetic head scans on a central position of each track, is always $(\frac{1}{2}) V_{cc}$ level.

When the tape speed at recording and the tape speed at reproducing differ from each other, the output level of the comparing circuit varies. For example, in the magnetized tracks shown in FIG. 13, the obtained output of the comparing circuit shows such variation as "a" point to "b" point when the reference signal is $f_1$, as the magnetic head scans from a central position of the track $A_1$ to a central position of the track $A_3$ by one magnetic head scanning period.

Next, the variation of the output of the comparing circuit when the reference signal is changed during the scanning operation of the magnetic head on a certain track, is described as follows. When the magnetic head scans on the central position of the track $A_1$ as shown in FIG. 13, the output of the comparing circuit is $(\frac{1}{2}) V_{cc}$ when the reference signal is $f_1$, the output is High level when the reference signal is $f_2$, the output is $(\frac{1}{2}) V_{cc}$ when the reference signal is $f_3$, and the output is Low level when the reference signal is $f_4$. This represents the fact that the kind of the pilot signal recorded on the track can be detected by detecting level of the output of the comparing circuit under each reference signal. For example, when the reference signal is $f_2$ and the output of the comparing circuit is High level, the magnetic head scans on the track on which the pilot signal of $f_1$ is recorded. The present invention utilizes such property.

Four kinds of frequency are used for the reference signal. These reference signals are obtainable by frequency de-multiplying an original signal of 378 $f_H$, and switching of the kinds of the reference signals can be made by a 2-bit signal. In the embodiment, each reference signal corresponds to binary signals as shown in FIG. 11. As apparent from FIG. 11, the reference signal is switched changed in an order of $f_1$, $f_2$, $f_3$ and $f_4$ by sequentially adding 1 to the binary signal. For instance, when the binary signal B is "11" corresponding to $f_4$ is added by 1, the binary signal B becomes "100". But only lower positional 2 bits is used for the binary signal B for selecting the reference signal. Thus, it is apparent that the $f_1$ is selected after the $f_4$.

FIG. 12 is a table showing the reference signal at normal reproducing, the reference signal when the output of the comparing circuit becomes High or Low level, and how many times the binary signal is made up or down in order to obtain such reference signal for obtaining High or Low level. For example, when the normal reference signal is $f_1$, that is, when the magnetic head scans on the track $A_1$, the output of the comparing circuit is made High by shifting the reference signal to $f_2$. The reference signal of $f_2$ is obtained by adding 1 to the binary signal. Further, at this state, in order to shift the output of the comparing circuit Low, it is enough to make the reference signal to $f_4$. For shifting the reference signal to $f_4$, it is enough to make the binary signal be added by 3. Likewise, those cases when the normal reference signal is $f_2$, $f_3$ and $f_4$, can be dealt. Further, $A_{ch}$ and $B_{ch}$ shown in FIG. 12 are periods when the magnetic heads A and B scan on the magnetic tape. H.SW is a mark representing a head switching signal which is in synchronism with rotation phase of the rotary head.

As apparent from FIG. 12, in order to make the output of the comparing circuit High level, the signal for selecting the normal reference signal is to be added by 1 during a period $A_{ch}$, and the signal for selecting the normal reference signal is to be subtracted by 1 during a period $B_{ch}$. Further, in order to make the output of the comparing circuit Low level, the signal for selecting the normal reference signal is to be added by 3 during the period $A_{ch}$, and the signal for selecting the normal reference signal is to be subtracted by 3 during the period $B_{ch}$.

FIGS. 10(a)–10(d) are diagrams showing the output of the comparing circuit under various conditions. FIG. 10(a) is the signal H.SW. And the $A_{ch}$ period represents the High level period. FIG. 10(b) is a normal output of the comparing circuit and the level is equal to $(\frac{1}{2}) V_{cc}$ level. FIG. 10(c) shows an output of the comparing circuit when the magnetic heads having different head heights are used for reproducing. Though the mechanical height of the magnetic heads A and B should be equal from a standard surface, practically they are not precisely equal on account of the unevenness of the production precision. The level of the output of the comparing circuit when these magnetic heads having different head heights are used is higher by a certain amount than $(\frac{1}{2}) V_{cc}$ level or lower as shown in FIG. 10(c). Since the tracking error signal is a signal produced by inverting the output of the comparing circuit with regard to the level of $(\frac{1}{2}) V_{cc}$ during the period $B_{ch}$, the average value becomes $(\frac{1}{2}) V_{cc}$ and the control system becomes stable under this condition. Further, when the recording and the reproducing are executed on such decks having different track curves as frequently shown in such reproducing using a compatible VTR, component of the track curve appear in the output of the comparing circuit as shown in FIG. 10(d).

When the output of the comparing circuit is as shown in FIG. 10(c) and FIG. 10(d), such High and Low signals as shown by marks 1001 and 1002 are obtained by changing the reference signal for a certain period. Here, the limits of the High level and Low level are the power source potential $V_{cc}$ and a ground potential GND. As apparent from FIG. 10(d), large variation amount can be obtained by selecting such reference signal that the output level of the compmaring circuit becomes Low level, when the output of the comparing circuit before the changing of the reference signal, is higher than the ($\frac{1}{2}$) $V_{cc}$.

In the present invention, detection is made not for finding whether the output of the comparing circuit, when the reference signal is changed, is High level or not; But the detection is made for finding the difference 1003 or 1004 of the levels of the outputs of the comparing circuit before and after the change of the reference signal. Thus, a more reliable detecting method can be executed that the method of detecting the output of the comparing circuit after the change of the reference signal.

Further, the output level of the comparing circuit before the change of the reference signal is searched and the reference signal is selected in a manner that the output level becomes Low level when the searched level is higher than ($\frac{1}{2}$) $V_{cc}$, and High level when the searched level is lower than ($\frac{1}{2}$) $V_{cc}$. Thus, the level difference before and after the change of the reference signal can be made large.

The method for detecting whether the mode (SP mode or LP mode) at recording is equal to the mode at reproducing or not, is described as follows.

Figure 7:
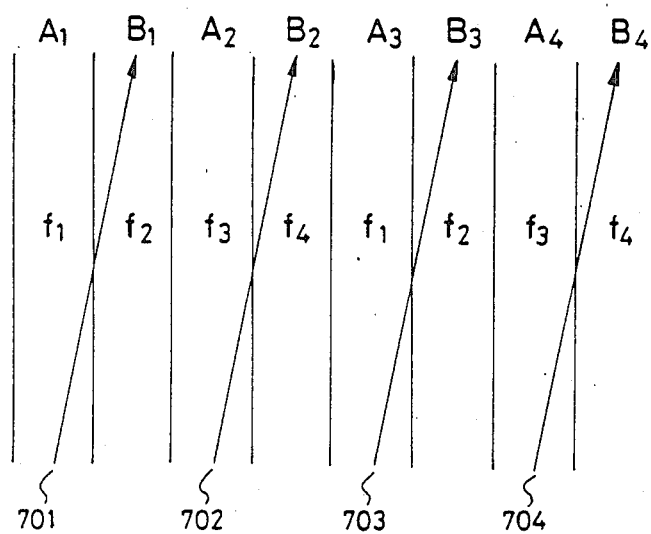
FIG. 7 is a diagram of the magnetic head head scanning locus when a magnetic tape recorded under LP mode is reproduced under SP mode.

FIG. 7 is a diagram showing the scanning locus of the magnetic head when the magnetized track recorded on LP mode is reproduced on SP mode. In the figure, $A_1$, $B_1$, $A_2$, ... show the magnetized tracks recorded on LP mode by the magnetic heads A and B. Numerals 701–704 show the scanning locus of the magnetic head when the reproducing is executed on SP mode. The scanning locus of the magnetic head at the time corresponds to 2 times speed reproducing on LP mode, and therefore the scanning locus is represented by FIG. 7.

Figure 8:
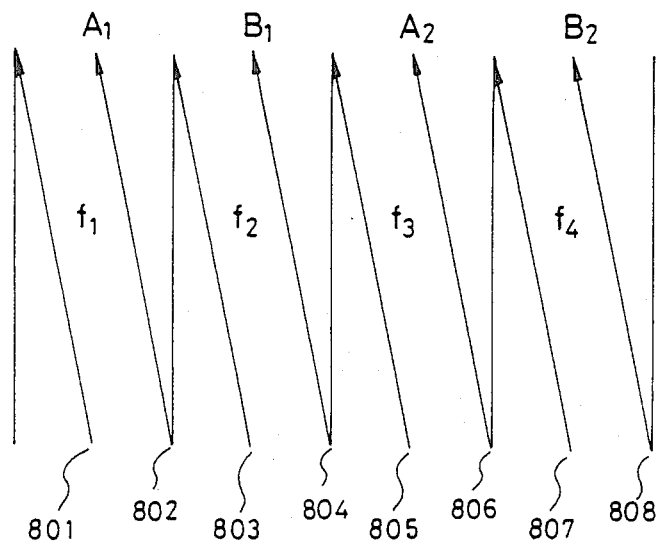
FIG. 8 is a diagram of the magnetic head scanning locus when a magnetic tape recorded under SP mode is reproduced under LP mode.

FIG. 8 is a diagram showing the scanning locus of the magnetic head when the magnetized track recorded on SP mode is reproduced on LP mode. But this time, the scanning locus of the magnetic head corresponds to ($\frac{1}{2}$) speed reproducing on SP mode, and therefore the scanning locus of the magnetic head is shown by marks 801–808.

The output of the comparing circuit obtained by the magnetic head scanning in FIG. 7 and FIG. 8 is shown in FIG. 9. Further, variation of the output of the comparing circuit obtained by changing the reference signal for a certain period, is also shown in FIGS. 9(a)–9(e). FIG. 9(a) shows H.SW signal and FIG. 9(b) shows the reference signal. The reference signal is switched in the order of $f_1$, $f_2$, $f_3$, $f_4$, in normal state, and here the reference signal is switched to another reference signal for a certain period within each magnetic head scanning period. In FIG. 10, shows such another reference signal that the output of the comparing circuit becomes High level under normal reproducing. The selection of the reference signal during each magnetic head scanning period is determined by utilizing the relation shown in FIG. 12. FIG. 9(c) shows the output signal of the comparing circuit when the mode is equal at recording and at reproducing. Output of the comparing circuit is normally ($\frac{1}{2}$) $V_{cc}$ level but always becomes High level only, when the reference signal is changed. The level difference is such value indicated by numeral 901 and the output after the change is always larger than the output before the change.

FIG. 9(d) shows the output of the comparing circuit when the magnetized track recorded on SP mode is reproduced on LP mode. The output of the comparing circuit is shown by the waveform indicated by a full line when the reference signal is not changed. The waveform can be made from FIG. 8 and FIG. 13. The output of the comparing circuit when the reference signal is changed for a certain period, is shown by the waveform indicated by a broken line. The pulse waveform indicated by the broken line, for example, 904, can be made from FIG. 13 by producing the output of the comparing circuit when the reference signal is $f_2$ under the magnetic head scanning 801 in FIG. 8. As is apparent from FIG. 9(d), only waveform 904 shows that the variation of the output of the comparing circuit before and after the reference signal change is comparatively large and the output after the change is of higher level than the output before the change. Therefore, the difference between FIG. 9(c) and FIG. 9(d) can be clearly detected by detecting the level difference before and after the reference signal change and the polarity of the variation.

FIG. 9(e) shows a waveform of the output of the comparing circuit obtained by reproducing on SP mode the magnetized track recorded on LP mode. Since the variation of the output of the comparing circuit obtained by changing the reference for a certain period is small as indicated by 903, state of FIG. 9(c) and the state of FIG. 9(e) can be discriminated clearly.

Next, the detecting principle at high speed reproducing is described.

Figure 5:
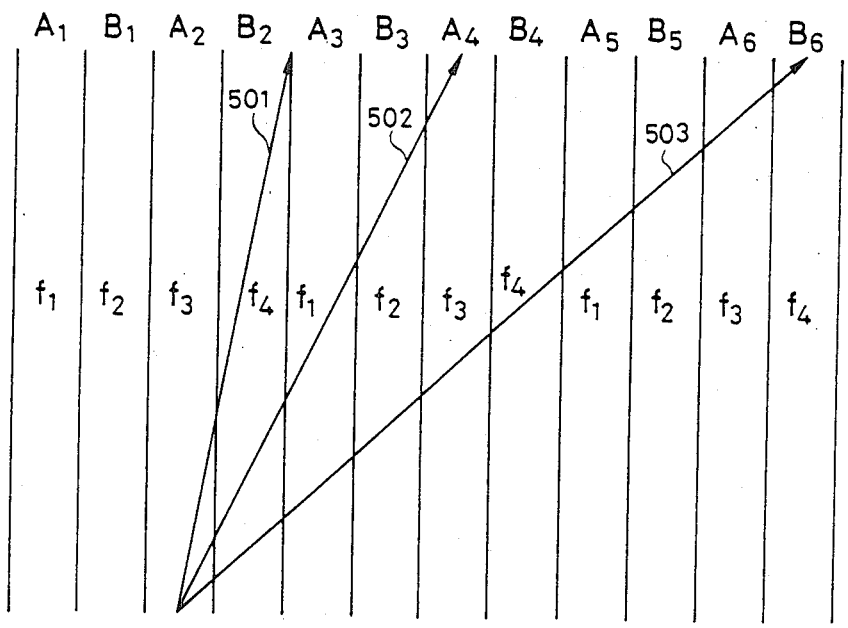
FIG. 5 is a diagram of a magnetic head scanning locus at 5 times speed reproducing under each mode.

FIG. 5 is a diagram showing the magnetic head scanning locus at 5 times speed reproducing under each reproducing mode. In the figure, the magnetic head scanning locuss 502 is the scanning locus when the recording and the reproducing modes are equal. Numeral 501 shows the magnetic head scanning locus when the magnetized track recorded on SP mode is reproduced to 5 times speed on LP mode. Since the tape speed of LP mode is ($\frac{1}{2}$) of that of SP mode, the magnetic head scanning locus is equivalent to the magnetic head scanning locus at 2.5 times speed reproducing with regard to the recorded magnetic locus. Numeral 503 shows the magnetic head scanning locus when the magnetized track recorded on LP mode is reproduced at 5 times speed reproducing on SP mode. Here, the magnetic head scanning locus is equivalent to the magnetic head scanning locus at 10 times speed reproducing with regard to the recorded magnetic locus.

Figure 6:
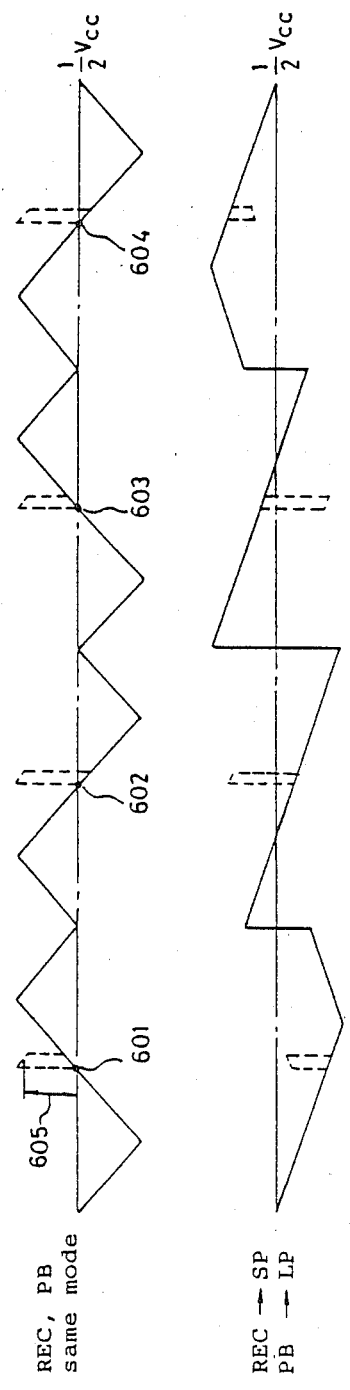
FIGS. 6(a)–6(e) are diagrams of an output of a comparing circuit at 5 times speed reproducing under each mode.

FIGS. 6(a)–6(e) are diagrams showing each output of the comparing circuit obtained by each magnetic head scanning. FIG. 6(a) is H.SW signal and FIG. 6(b) is a reference signal. The reference signal is changed for a certain period in a manner that the output of the comparing circuit becomes High level under normal reproducing status. FIG. 6(c) is the output of the comparing circuit when the recording mode and the reproducing mode are equal to each other, and FIG. 6(d) is the output of the comparing circuit when the magnetized track recorded on SP mode is reproduced on LP mode, and FIG. 6(e) is the reproduced output of the comparing circuit when magnetized track recorded on LP mode is reproduced on SP mode, respectively shown by full lines. Each output of the compring circuit shown by broken line is the output obtained by changing the reference signal for a short period.

The tracking control at high speed reproducing is executed in order to make a noise bar, which appears in the reproduced video image, stand still at a certain position on the screen. The tracking error signal to be used in the high speed reproducing, is obtained by sample-holding the tracking error signal at such position when a predetermined period elapses from each edge of the rise-up and fall-down of the H.SW signal. The position to be sample-held is a position just before the changing of the reference signal and indicated by the numeral 601-604 in FIG. 6(c). The tracking error signal is given by inverting the output of the comparing circuit during the period $B_{ch}$. The relative position of the tracking error signal against the H.SW signal varies responding to the scanning position of the magnetic head against the recorded magnetized track. Responding to the scanning position of the magnetic head, the waveform in FIG. 6(c) is shifted to left or right on the drawing against the H.SW signal. At this time, the level of the tracking error signal which is sample-held at each position indicated by the numerals 601-604 is given in a manner that a higher level than ($\frac{1}{2}$) $V_{cc}$ level is sample-held for every magnetic head scanning when the output of the comparing circuit is shifted to the left on the drawing sheet, and a lower level than ($\frac{1}{2}$) $V_{cc}$ level is sample-held for every magnetic scanning when the output is shifted to the right (note that the tracking error signal during the period $B_{ch}$ is given by inverting the output of the comparing circuit). Therefore, the control system becomes stable when the voltage of the tracking error signal at each sample position indicated by the numerals 601-604, becomes ($\frac{1}{2}$) $V_{cc}$, by executing the tracking control basing on the standard voltage of ($\frac{1}{2}$) $V_{cc}$ level.

As shown in FIG. 6(c), the difference between the voltage just before the change of the reference signal and the voltage after the change, is always at the level indicated by numeral 606 during each magnetic head scanning period. In the present invention, since the tracking control is executed by utilizing the signal sample-held at such position just before the change of the reference signal, a disadvantage, a that the output of the comparing circuit after the change of the reference signal is limited by the power source voltage or the ground potential and the variation width decrease, can be eliminated.

When the recording mode and the reproducing mode are different, the output of the comparing circuit becomes such waveforms as indicated in FIG. 6(d) and FIG. 6(e). Here, even though the tracking control is executed by using the signal sample-held at a position after a certain period from each edge of the H.SW signal, the control can not be executed. That is because the sample-held potentials obtained at each sample position are different to each other. Therefore, the waveform of the output of the comparing circuit against the H.SW signal does not necessarily become the waveform as shown in FIG. 6(d) and FIG. 6(e). As one example, the waveforms shown in FIG. 6(d) and FIG. 6(e) are used for following description. The output of the comparing circuit after the change of the reference signal is indicated by the broken line. Therefore, as apparent from the figure, the level variation before and after the change of the reference signal is not necessarily large. Further, the level after the change is not necessarily larger than the level before the change. Accordingly, difference between the status of FIG. 6(c) and the statuses of FIG. 6(d), (e) can be detected by searching the level variation before and after the change of the reference signal and the polarity. That is, at a high speed reproducing, it can be known whether the mode at reproducing agrees to the mode at the recording.

Next, a specified and preferable embodiment of the present invention is described.

Figure 1:
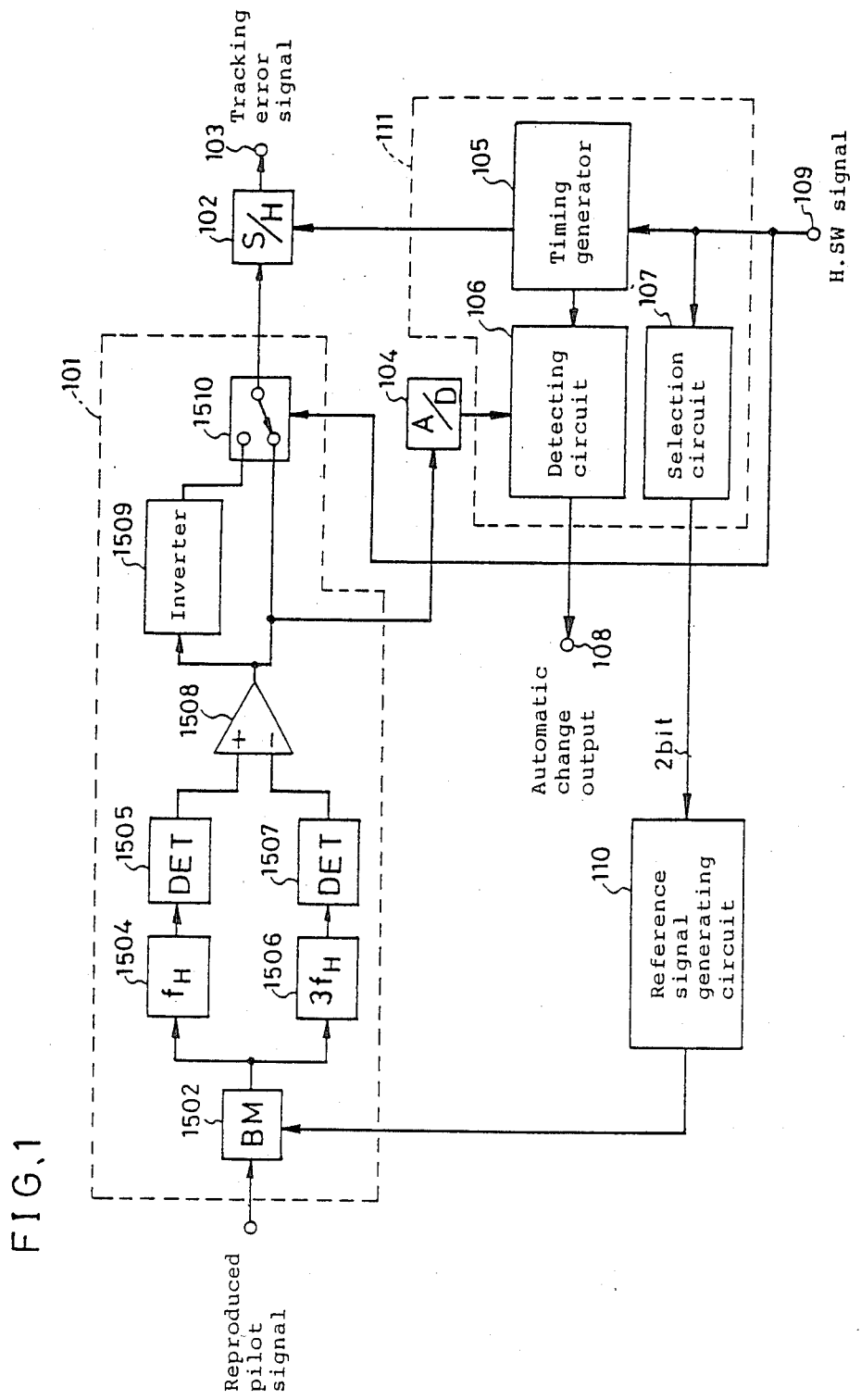
FIG. 1 is a block diagram showing a circuit of an embodiment of the present invention.
Figure 14:
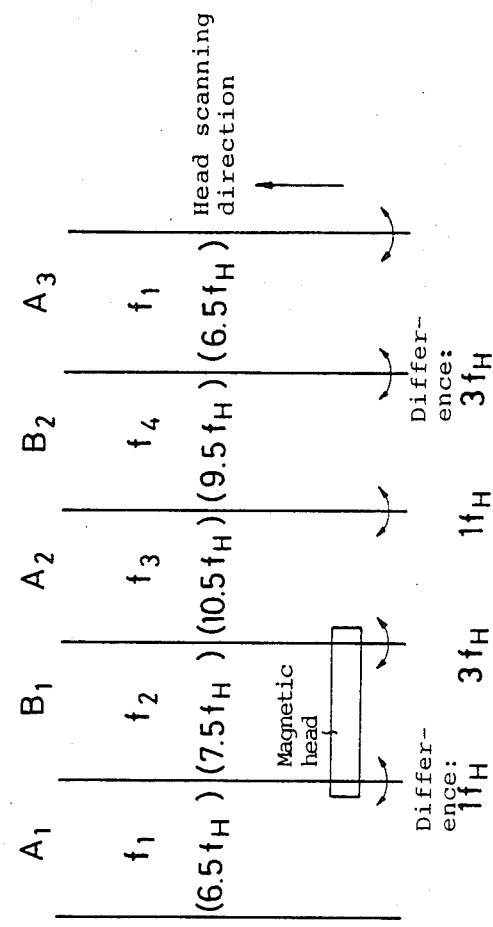
FIG. 14 is a diagram of a recorded magnetized track of a pilot signal.
Figure 15:
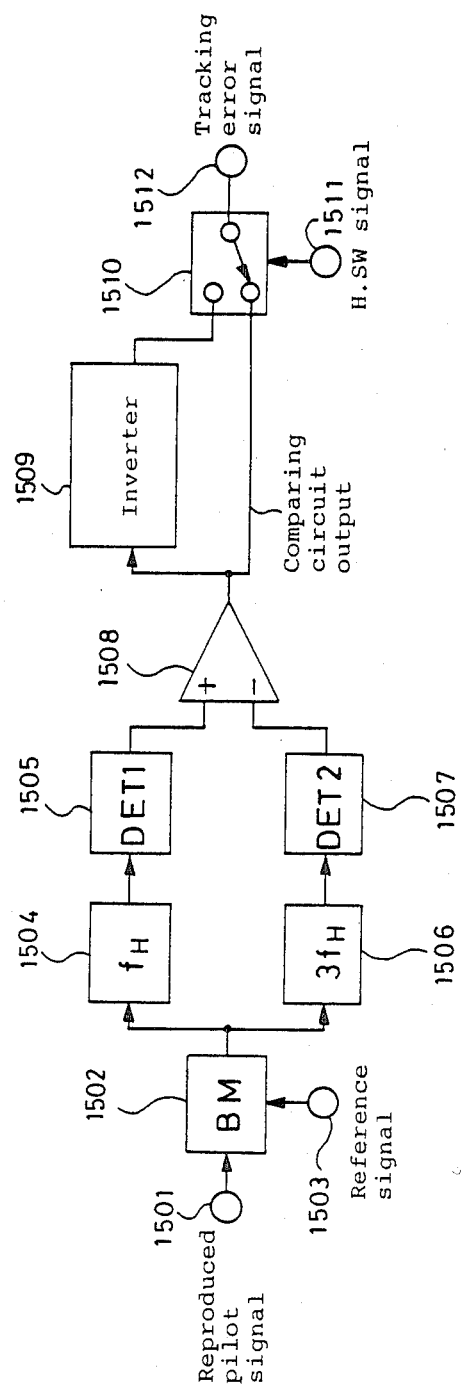
FIG. 15 is a block diagram showing a circuit for generating a tracking error signal.

FIG. 1 is a block diagram showing the embodiment of the method for detecting a tape speed at recording of the present invention. In the figure, the block indicated by the numeral 101 is a processing circuit for obtaining the tracking error signal from the reproduced pilot signals. In the figure, a circuit 1502 is a balanced modulation circuit. The reproduced pilot signal is applied to a terminal 1501 and a reference signal is applied to a terminal 1503. The reference signal has the same frequency as the pilot signal which is recorded on the magnetized track to be scanned by the magnetic head. For example, as shown in FIG. 14, when the magnetic head scans for reproducing on the track $B_1$, the frequencies of reproduced pilot signals are $f_1$, $f_2$, $f_3$ and the frequency of the reference signal is $f_2$. An output signal of the circuit 1502 has components of sum and difference of frequencies of the reproduced pilot signal and the reference signal. The output difference signal has components of frequencies of $f_H$ and $3f_H$. The levels of these components of difference signal are equal to the reproduced levels of the respective pilot signals which are recorded on the tracks neighboring the track on which the magnetic head mainly scans for reproducing. Circuits 1504 and 1506 are tuning circuits which tune into such signals having frequencies of $f_H$ and $3f_H$, respectively. The output signals of these tuning circuits are detected and rectified by circuits 1505, 1507, respectively, and the rectified levels are compared with each other by a comparing circuit 1508. The output of the comparing circuit 1508 is inverted with regard to the level of ($\frac{1}{2}$) $V_{cc}$ (where $V_{cc}$ is the power source voltage) which is taken as center of inversion by an inverter 1509. The inverted output signal and the non-inverted output signal are applied to a switching circuit 1510, and are issued alternately every one field, responding to a head switching signal (H.SW signal) supplied from a terminal 109.

A sample-hold circuit 102 sample-holds the tracking error signal at a high speed reproducing etc. and issues it. Sample pulses are in synchronism with the H.SW signal in phase and supplied from a timing generator 105.

The reference signal which is to be applied to the balanced modulator 1502 is generated from a reference signal generator 110. The selection of the reference signal is executed responding to an instruction of 2 bits supplied from a reference signal selection circuit 107. An A/D conversion circuit 104 converts the output of the comparing circuit to digital signals. A detecting circuit 106 automatically detects the mode at recording and issues it to a terminal 108 according to the principle mentioned above. The H.SW signal is applied to the terminal 109 and is utilized as a standard signal for instructing various timing signals and reference signals. Each process within a block 111 surrounded by a broken line, can be dealt by using software of a microcomputer. The program of the microcomputer is described as follows.

Figure 2:
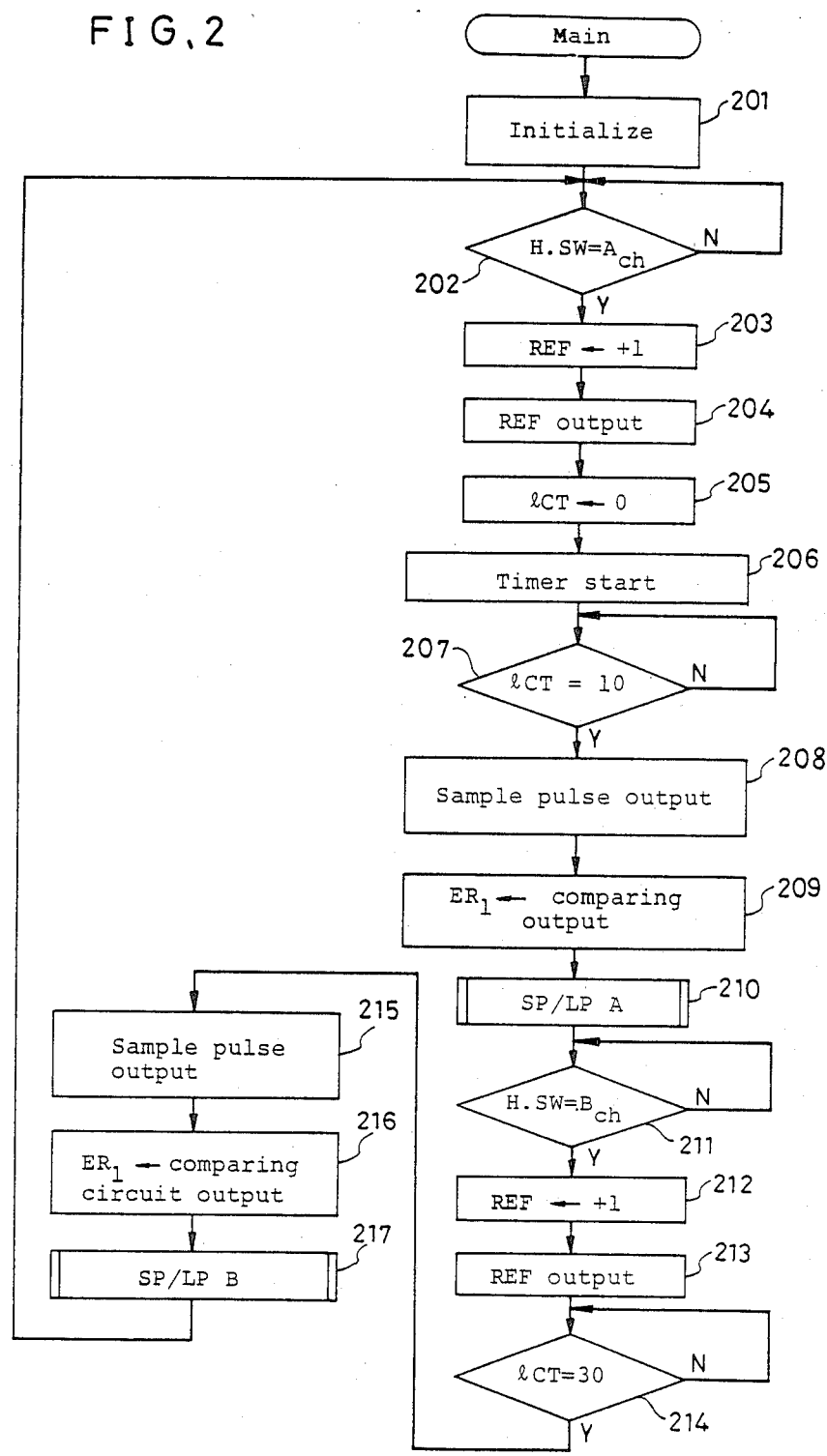
FIG. 2 is a flowchart of a main program in a microcomputer applied to the present invention.
Figure 3:
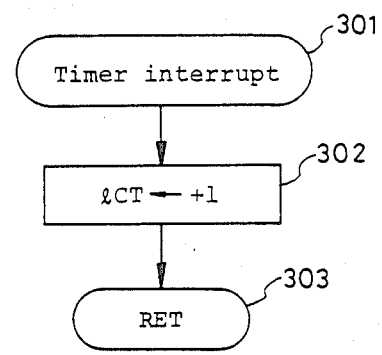
FIG. 3 is a flowchart of a program for timer interrupt of the microcomputer applied to the present invention.
Figure 4:
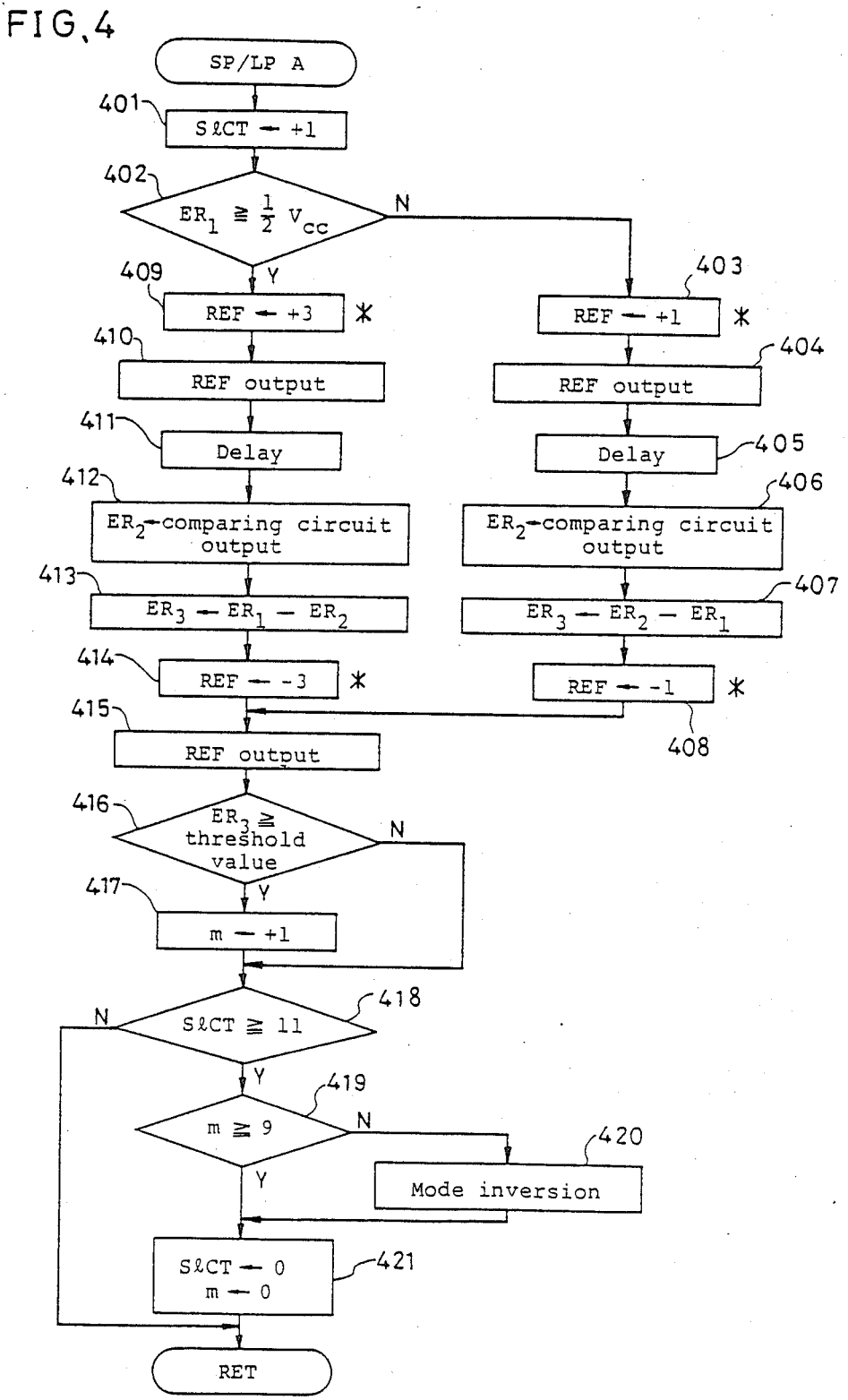
FIG. 4 is a flowchart of a program for automatically detecting process of the microcomputer applied to the present invention.

FIG. 2–FIG. 4 are flowcharts showing the process for detecting the mode at recording.

FIG. 2 is a main routine, FIG. 3 is a timer interrupt routine and FIG. 4 is a subroutine for detecting the recording mode.

After the power source is ON, each step shown in FIG. 2 is executed. In the figure, a step 201 is for initializing and set the reference signal to be a binary value B"11" and clears each RAM. A step 202 is for detecting whether the H.SW signal is the $A_{ch}$ period or not. When the H.SW signal is not the $A_{ch}$ period, the step 202 is repeated and when the H.SW signal is the $A_{ch}$ period, a step 203 and thereafter are executed. The step 203 is for selecting the reference signal and adds 1 to the contents of RAM indicated by REF. The REF is already set with the binary value B"11" at initial setting. Therefore, the value of REF becomes a binary value B"100" by the step 203. The relation between the reference signal and the binary value has been already described referring to FIG. 11. A step 204 issues the lower positional 2 bits, B"00". of the numeral in the REF, that is, the instruction of $f_1$. A step 205 is for clearing values of RAM, lCT for a loop counter which is added by 1 every timer interrupt mentioned below. A step 206 is for starting an inner timer of the microcomputer. In the embodiment, the timer value is set in a manner that the timer interrupt is executed every 1/40 of one frame period. A step 207 is a process for deciding and repeats same process until the lCT value becomes, for example, 10. Since the value of lCT becomes 40 during one frame period, time when the lCT value becomes 10, is such time that about ($\frac{1}{4}$) field elapses after the H.SW signal becomes the $A_{ch}$, namely, is about half of the $A_{ch}$ period. A step 208 is for issuing sample pulses supplied to the sample-hold circuit 102 shown in FIG. 1. A step 209 is for storing output of the comparing circuit just after the sample pulse is generated, to the RAM indicated by $ER_1$. The output of the comparing circuit at this time corresponds to the output of the comparing circuit before the change of the reference signal mentioned above. A step 210 is a subroutine for detecting the recording mode and the detail is described after. A step 211 is for a process for deciding and repeats same processes until the H.SW signal becomes $B_{ch}$ period. A step 212 adds 1 to the binary value of the reference signal and a step 213 issues an instruction for the reference signal of the lower positional two bits. As apparent from the above-mentioned description, the instruction for the reference signal is added by +1 every each edge of the H.SW signal. Therefore, the reference signal is issued in order of $f_1$, $f_2$, $f_3$ and $f_4$. A step 214 is a process for deciding and repeats same processes until the time when lCT value becomes 30. The period until the time when lCT values becomes 30 is equal to about half of the $B_{ch}$ period. A step 215 is for issuing sample pulses supplied to the sample-hold circuit 102 as shown in FIG. 1. A step 216 is for storing the output of the comparing circuit just after the sample pulse is generated to the RAM indicated by $ER_1$. A step 217 is a subroutine for detecting the recording mode under the $B_{ch}$ period and has such content which is different from the content of the step 210 with regard to some constants. The detail of the step 217 is described after. After the 217 step, the step 202 is executed again, to wait until the H.SW signal becomes the $A_{ch}$ period. The above-mentioned content is the main routine.

FIG. 3 is a flowchart of the timer interrupt process. When the timer interrupt is produced during each step of FIG. 2, the interrupt process as shown in FIG. 3 is executed. In the interrupt process, the value of the loop counter lCT is added by +1 as shown in a step 302.

Next, a subroutine step 210 in FIG. 4 is described. FIG. 4 shows the flowchart of the subroutine defined as "SP/LP A". In the figure, a step 401 is for adding 1 to the value of the RAM indicated by SlCT which counts the execution number of the subroutine. A step 402 is for deciding whether the output $ER_1$ of the comparing circuit before the change of the reference signal, is smaller than ($\frac{1}{2}$) $V_{cc}$ level or not. When the value $ER_1$ is equal or larger than the ($\frac{1}{2}$) $V_{cc}$ level, a step 409 and after are executed, and when the value $ER_1$ is smaller than ($\frac{1}{2}$) $V_{cc}$ level, a step 403 and after are executed. A step 403 adds 1 to the instruction for the reference signal. The step is for making the output of the comparing circuit High level as apparent from FIG. 12. A step 404 issues an actual instruction for the reference signal. A step 405 is for delaying a certain period. The delay period is set corresponding to such period required until the output of the comparing circuit becomes stable after the change of the reference signal. A step 406 is for storing the output of the comparing circuit after the change of the reference signal to the RAM indicated by $ER_2$. A step 407 stores a value which is obtained by subtracting the value of $ER_1$ from $ER_2$, to $ER_3$. A step 408 is for returning the instruction value of the reference signal changed in the step 403 to the instruction value before the change. A step 415 issues the instruction value before the change.

When the value of $ER_1$ is larger or equal to the ($\frac{1}{2}$) $V_{cc}$, a step 409 and after are executed. A step 409 is for adding 3 to the instruction value of the reference signal. The process is for making the output of the comparing circuit Low level. A step 410 issues the actual instruction value of the reference signal. A step 411 is for delaying a certain period. A step 412 is for storing the output of the comparing circuit after the change of the reference signal to the RAM indicated by $ER_2$. A step 413 is for storing the difference which is made by subtracting a value of $ER_2$ from a value of $ER_1$, to the RAM indicated by $ER_3$. A step 414 is for returning the instruction value of the reference signal changed in the step 409 to the instruction value before the change. A step 415 issues the instruction value before the change.

As apparent from the above-mentioned description, when the output level of the comparing circuit before the change of the reference signal is larger or equal to the ($\frac{1}{2}$) $V_{cc}$ level, the step 409 and after are executed, thereby to generate such reference signal that the output of the comparing circuit becomes Low level. Further, when the output level of the comparing circuit before the change of the reference signal is smaller then ($\frac{1}{2}$) $V_{cc}$ level, the step 403 and after are executed, thereby to generate such reference signal that the output of the comparing circuit becomes High level. When the mode at recording and the mode at reproducing are equal, the level difference of the outputs of the comparing circuit before and after the change of the reference signal is stored always with positive value to the RAM indicated by $ER_3$.

A step 416 is for deciding whether the value of $ER_3$ is smaller than a threshold value or not. When the value of $ER_3$ is larger or equal to the threshold value, the value of the RAM indicated by "m" is added by 1. When the value of $ER_3$ is smaller than the threshold value, a step 418 is executed. Apparent from the description referring to the FIGS. 6(a)–6(e) and FIG. 9, when the mode at recording and the mode at reproducing are equal, the value of "m" is always added by 1 since the outputs of the comparing circuit before and after the change of the reference signal have a constant difference of positive direction. A step 418 is for a decision process to end the subroutine when the value of RAM, S1CT for counting the subroutine process number is smaller than a predetermined value, for example, 11, and to jump to a step 419 when the value is larger than or equal to the value of 11. A step 419 is for deciding process to execute a step 421 when the value of "m" is larger or equal to a predetermined value, for example, 9, and to execute a step 420 when the value is smaller than the 9. When the value of "m" is smaller than the predetermined value, the step 420 issue an instruction of different mode from the present reproducing mode; that is, when the present reproducing mode is SP mode, for example, an instruction of LP mode is issued; and when the present reproducing mode is LP mode, an instruction of SP mode is issued. A step 421 is for clearing the values of S1CT and "m". After this, the output of the comparing circuit is checked certain number of times.

The subroutine 217 indicated by ST/LP B in FIG. 2 is almost equivalent to the step 210. The difference is only that the value of each step indicated by * mark as shown in FIG. 4 is altered. That is, as apparent from FIG. 12, during the $B_{ch}$, the value of REF of the step 409 is subtracted by 3 and the value of REF of the step 403 is subtracted by 1. Further, the value of REF is added by 1 in the step 414 and the value of the REF is added by 1 in the step 408.

Incidentally, though the values of S1CT and "m" are described as 11 and 9 in this embodiment, it is obvious that these values can be arbitrarily set.

Further, the present invention is described referring to the embodiment that the level of the output of the comparing circuit is detected, but the recording mode can be also detected from the level variation of the tracking error signal considering the polarity.

As apparent from the above-mentioned description, according to the present invention, the recording mode at normal reproducing and at a high speed reproducing can be detected by simple operation.

According to the present invention, since the recording mode can be detected by the operation of the microcomputer, the microcomputer used, for example, for a system control can be also used for this detecting process. Therefore, the present invention has the advantage that superfluous tuning circuit etc. are not necessary.

Further, according to the present invention, the reduction of a dynamic range caused by the power source voltage and the ground potential can be eliminated, since the reference signal for obtaining the output of the comparing circuit of High or Low level is selected responding to the output level of the comparing circuit at that time.

Further, in the present invention, the reliability is higher than the method that the absolute value of the output of the comparing circuit after the change of the reference signal is detected, since the output level difference of the comparing circuit before and after the change of the reference signal is checked.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

What is claimed is:

1. A method for detecting a tape speed of recording in a magnetic recording and reproducing apparatus wherein information is sequentially recorded, as magnetized tracks which are oblique against a longitudinal direction on a face of a magnetic tape, by a rotary magnetic head means having at least one rotary magnetic head, and wherein four kinds of pilot signals of different frequency for tracking control are sequentially and cyclically mixed on said information, the apparatus having a circuit for processing a tracking error signal, including a multiplying circuit for obtaining plural kinds of difference frequency signals of reproduced pilot signals and reference signals, and wherein said information on the magnetic tape is reproduced at the same tape speed as or a different tape speed from that of recording; the method comprising the steps of:

supplying two kinds of said reference signals to said multiplying circuit within one magnetic head scanning period of said rotary magnetic head means during which said one magnetic head is in alignment with said tape, and detecting said tape speed at recording by detecting whether a level difference of outputs of a comparing circuit, obtained before and after a change between said two kinds of said reference signals, is larger than a predetermined threshold value or not.

2. A method for detecting a tape speed of recording in accordance with claim 1, wherein during said detecting step said change of said two kinds of said reference signals is executed in a manner that said output of said comparing circuit varies inversely in response to whether the output of the comparing circuit before the change of the reference signal is at a higher level than a standard potential or not.

3. A magnetic recording and reproducing apparatus in accordance with claim 2, further comprising:

output detecting means for detecting an output signal of said comparing circuit before the change of said reference signal, means for changing said two kinds of said reference signals in a manner that said output of said comparing circuit varies inversely in response to whether the output of the comparing circuit before the change of the reference signal is at a higher level than a standard potential or not.

4. A magnetic recording and reproducing apparatus in accordance with claim 2, further comprising:

means for sampling and holding said tracking error signal continually obtained, and control means for controlling a sensing position of the magnetic tape by using said held tracking error signals, and wherein said level detecting means detects said level difference between an output of said comparing circuit at the time of or just before said sampling and holding and an output of said comparing circuit obtained by changing said reference signal after said sampling and holding.

5. A method for detecting a tape speed of recording in accordance with claim 1 including the step of:

controlling a sensing position of said magnetic tape by using an error signal which is obtained by sampling and holding a tracking error signal continually obtained, and wherein during said step of detecting said tape speed of recording by detecting whether said level difference is larger than said threshold value, said difference is the difference in the output of said comparing circuit at the time of or just before said sampling and holding, and the output of said comparing circuit obtained by the change of said reference signal after said sampling and holding.

6. A magnetic recording and reproducing apparatus wherein information is sequentially recorded as magnetized tracks which are oblique against a lengthwise direction on a face of a magnetic tape by a rotary magnetic head means having at least one rotary magnetic head, and wherein four kinds of pilot signals of different frequency for tracking control are sequentially and cyclically mixed on said information, and wherein the information on the magnetic tape is reproduced at the same tape speed as or a different tape speed from that or recording tape speed;

said apparatus comprising;

a circuit for processing a tracking error signal, including a multiplying circuit for obtaining plural kinds of difference frequency, signals of reproduced pilot signals, and reference signals, supply means for supplying two kinds of reference signals to said multiplying circuit within one magnetic head scanning period of said rotary magnetic head means, level detecting means for detecting a level difference of outputs of a comparing circuit obtained before and after a change between said two kinds of said reference signals, means for determining whether said level of said difference is larger than a predetermined threshold value or not, count means for counting a number when said level of said difference is equal to or larger than said threshold value within a predetermined period, or a number when said level of said difference is smaller than said threshold value, and means for judging whether said number is a predetermined value or not.

* * * * *